March 10, 1959     C. R. FAST ET AL     2,876,839
FRACTURING FORMATIONS WITH A VOLATILE FLUID
Filed Feb. 8, 1956
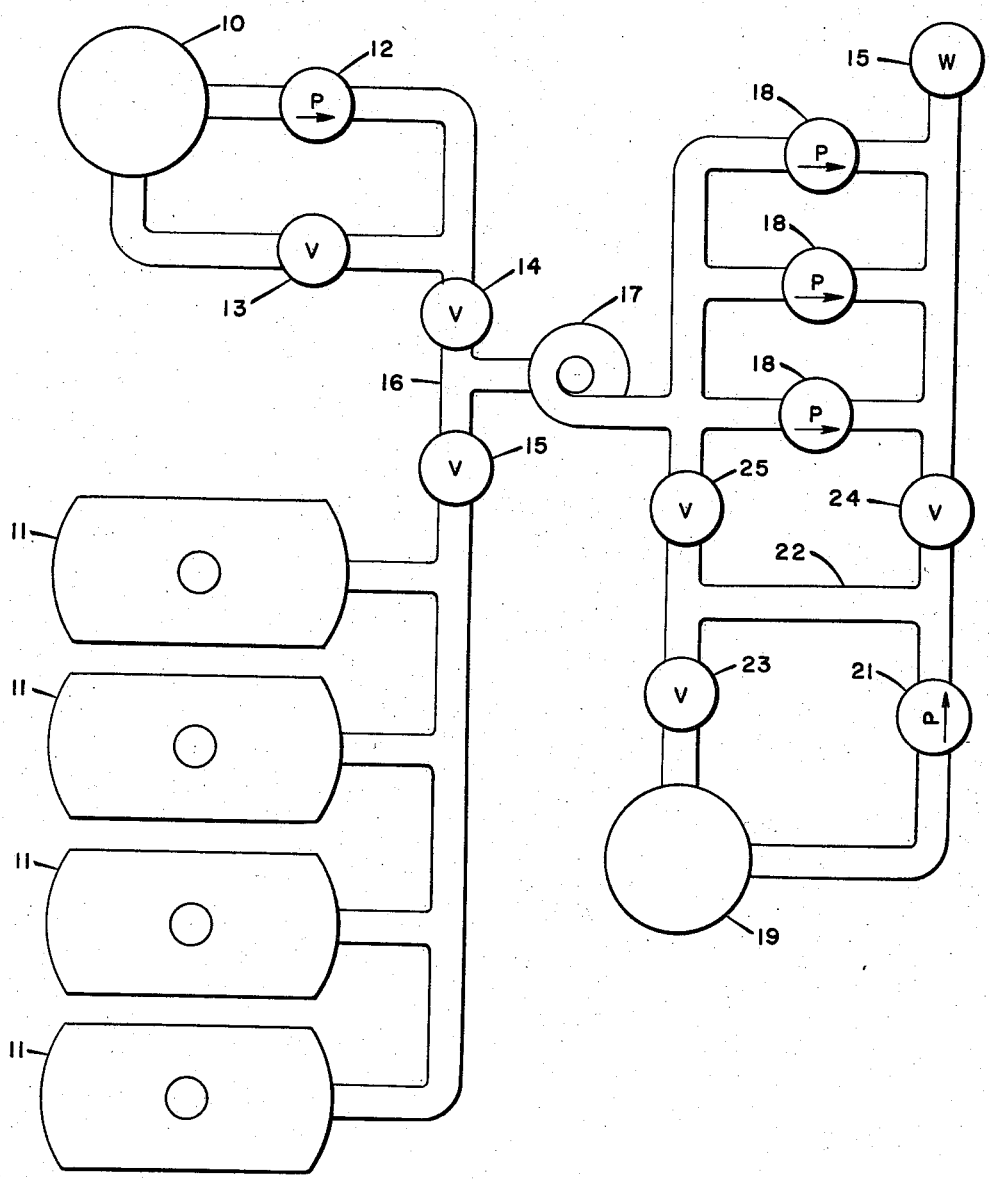
INVENTORS
CLARENCE R. FAST
GEORGE C. HOWARD
BY
*ATTORNEY*

2,876,839

FRACTURING FORMATIONS WITH A VOLATILE FLUID

Clarence R. Fast and George C. Howard, Tulsa, Okla., assignors to Pan American Petroleum Corporation, a corporation of Delaware Application February 8, 1956, Serial No. 564,240

14 Claims. (Cl. 166—22)

This invention is directed to an improved process for fracturing formations. More particularly, this invention is directed to an improved composition and method of producing that composition which is particularly adapted to fracturing a gas-producing formation that might otherwise be damaged by the presence of compositions previously employed in hydraulic fracturing processes.

The completion of wells by the use of hydraulic fracturing is by now a very common practice. Both liquid- and gas-producing formations have generally been fractured by injecting a low-penetrating nonvolatile liquid into the formation at high rate and under a high pressure. We have found that in some gas-producing formations, particularly in those formations of low permeability, the permeability is damaged or decreased, and occasionally even completely destroyed, by injecting a nonvolatile liquid into the formation. In small capillaries such as those encountered in these low permeability gas-producing formations, the presence or two immiscible liquids appears to produce the Jamin effect which plugs at least a part, if not all, of the permeable channels and this plug cannot be removed with the available gas pressure. This has been found particularly true in the relatively tight or low permeability gas-producing sandstone formations in and around the San Juan Basin (United States).

It is therefore an object of this invention to provide an improved fracturing liquid and procedure for fracturing such wells. It is a further object of this invention to provide by a novel process an improved fracturing liquid which is miscible to a large extent with the indigenous fluid in a gas-producing formation and to inject this liquid into that formation at sufficient pressure to produce a fracture therein. It is a more specific object of this invention to inject into a gas-producing formation, at a pressure sufficiently high to fracture that formation, a volatile liquid treated to reduce its filtrate rate into the formation and then to withdraw that volatile liquid by miscible fluid drive or generally by vaporization with the gas produced by the formation. Other objects and advantages of this invention will become apparent as the following detailed description proceeds.

In this description reference will be made to the accompanying drawing which is a plan view of a preferred apparatus used to prepare and inject our special fracturing fluid into a well.

This invention, in brief, may be described as an improved composition and method for preparing that composition and for fracturing formations which are damaged by the presence of a nonvolatile liquid. In this process, a volatile hydrocarbon such as liquefied petroleum gas is treated to decrease its filtrate rate and then injected into the gas-producing formation. The volatile liquid is removed from the formation by either miscible fluid drive or generally by vaporization with dry gas so that the interstices of the rock surrounding and adjacent to the fracture are not plugged permanently by the fracturing fluid.

Referring now to the accompanying drawing for a more detailed description of this invention, a nonvolatile liquid which may be an aqueous liquid such as acid is placed in tank 10 which may be for the purpose of this process a low pressure or an open tank. To this nonvolatile liquid is added an agent which together with the nonvolatile liquid will produce a low penetrating fluid when they are mixed with the volatile liquid which is initially stored in pressure tanks 11. In a preferred embodiment, a quantity of a water-soluble emulsifying agent such as polyoxyethylene sorbitan monolaurate having a molecular weight of about 1200, which is available commercially from the Atlas Powder Company as Tween 20, and a finely divided solid, preferably a colloid such as the water-soluble gums, e. g. karaya or locust bean gum, are dissolved in the nonvolatile aqueous liquid in tank 10 by placing them together in the tank and circulating them through pump 12 and open valve 13, valve 14 being closed. Between about 1 and about 10 pounds, preferably about 2 pounds, of −100 mesh U. S. sieve locust bean gum per barrel of the eventual emulsion are added to the materials in tank 10 to reduce the filtrate rate of the emulsion to about 200 cc. or less in 30 minutes on the standard API filtrate tester. Obviously, any other method of mixing, such as stirring the two components together in the tank, may be employed if desired. In this description, reference will be made to a specific test in which about 25,000 gallons of fracturing fluid are injected into well 15. The aqueous liquid and emulsifying agent in tank 10 comprise between about 2 and about 10 percent by volume of the total quantity of fracturing fluid. As a typical example, 1,000 gallons of about 15 percent hydrochloric acid solution are placed in tank 10 and sufficient emulsifying agent is added to this nonvolatile liquid to stabilize the emulsion produced from the volatile and nonvolatile liquids when they are combined under emulsifying conditions. Generally, between about 1 and about 3 parts by volume of the emulsifying or stabilizing agent per 100 parts by volume of hydrochloric acid solution are employed. In the specific test referred to above, 20 gallons of Tween 20 and about 1000 pounds of locust bean gum are added to 500–2000, typically 1,000, gallons of 15 percent hydrochloric acid and these constituents are cycled in the tank as above described until they are thoroughly mixed, i. e., until the emulsion stabilizer and the filtrate rate control agent (the water-soluble gum) are completely dissolved. In this description and claims, the term "dissolve" is intended to include, unless otherwise designated, all mixtures whether they are suspensions, dispersions, or true solutions of two or more liquids or a liquid and a solid. While in the preferred example discussed above water or an acid solution and an emulsifying agent are mixed in tank 10 preparatory to forming an emulsion with a volatile liquid, other gelling agents for the volatile liquid can be prepared by substantially the same process. For example, various oil-soluble metallic soaps such as napalm soap or other soaps used in the grease-making art or other long chain compatible gelling agents may be combined with suitable nonvolatile light hydrocarbons such as gasoline, kerosene or naphtha by dissolving the gelling agent in the hydrocarbons as the two are cycled through pump 12 and valve 13.

In any case, after the gelling agent has been prepared in tank 10, valve 13 is closed and valves 14 and 15 are opened permitting the gelling agent in tank 10 to be discharged by pump 12 and mixed as the two liquids meet in the T 16 with the volatile hydrocarbons from pressure tanks 11. As these two liquids are mixed, pump 12 discharges the gelling liquid against a pressure at least as great as the vapor pressure of the volatile liquid at the existing temperature. The liquid in these tanks 11, as indicated above, is a volatile liquid which as used in this specification and the appended claims refers to any liquid which readily vaporizes at the bottom hole well temperature and pressure existing in the particular well being hydraulically fractured after the well is put on production. A volatile liquid would thus have an end point at bottom hole pressure lower than the bottom hole temperature. Typical liquids of this class are acetone, methanol, ethanol, ethane, propane, butane or mixtures thereof which are gas-miscible or otherwise vaporized in the presence of relatively dry natural gas. A preferred volatile liquid comprises mixtures of light hydrocarbons known generally as liquefied petroleum gas and often referred to as LPG. This material comprises generally small amounts of $C_2$, $C_5$ and $C_6$ hydrocarbons with substantially greater amounts of $C_3$ and $C_4$ hydrocarbons. The vapor pressure of such a composition at normal atmospheric temperature of about 80° is typically in the range of about 40–100 p. s. i. At bottom hole temperatures which range from about atmospheric temperatures to about 200° F. or higher, the vapor pressure is higher, possibly as much as 700 p. s. i. or higher. Assuming that the pressure tanks 11 contain liquefied petroleum gas having a vapor pressure at atmospheric temperature of 90 p. s. i., this liquid will exert a pressure at T 16 equal to the vapor pressure of the liquid and, therefore, pump 12 will discharge the gelling agent for the liquefied petroleum gas at about 90 p. s. i. or greater. After the two liquids are thus combined or mingled, they are thoroughly mixed, i. e., homogenized or emulsified in emulsifier pump 17. As an emulsion, the composition is a homogeneous mixture of the volatile liquid and the nonvolatile liquid with the polyoxyethylene sorbitan monolaurate as a stabilizing agent. Where a strong mineral acid such as hydrochloric acid is used as the nonvolatile liquid, the acid acts as a dormant demulsifier to break the emulsion or gel after it is placed in the formation. Emulsifier pump 17 may be any of the various known types of emulsifiers or homogenizers, but commercially it is usually a high speed centrifugal pump which shears the mixture at high rate and, additionally, increases the fluid pressure.

The emulsion produced in the emulsifier pump 17 may be injected directly into well 15. Typically, however, inasmuch as high pressures of the order of 1000–6000 p. s. i. or greater are required at the surface to fracture formations penetrated by a deep well, the discharge from the emulsifier is passed through one or more positive displacement pumps 18 which further increase the fracturing fluid pressure to that required to break down or fracture the formation. The emulsion produced at this point may have a viscosity on the Gardner Mobilometer of about 5–30 poises or more depending upon the kind and amount of emulsifying agent, the ratio of the constituents, the speed and rate of shear of the emulsifier pump 17, and the like. A viscosity of at least about 10 poises is desirable and a fluid loss or filtrate rate as determined on the standard API filtrate test apparatus using the standard API procedure is preferably less than about 100 cc. in 30 minutes. A fracturing fluid with these characteristics may, as indicated, be injected directly into the well 15. In the preferred embodiment, however, a quantity of propping agent, which is typically sand, is dispersed in the fracturing fluid after it passes the emulsifier pump 17 and before it enters the well. This propping agent is added by first dispersing or slurrying it in a liquid or gel sufficiently viscous to carry or suspend the propping agent temporarily. Sufficient propping agent is added to the carrying liquid to amount, in the case of a sand-propping agent, to about ½–5 pounds of sand per gallon of fracturing fluid. In a preferred example, there are about 10 pounds of sand in each gallon of the slurry. To disperse this propping agent in the primary emulsion, the sand and the viscous carrying agent are first mixed together as follows. The sand-carrying agent, which may comprise, for example, a viscous oil or even a gel such as an emulsion of water and oil having a viscosity great enough to retard substantially the settling of sand, is first placed in tank 19. An emulsion of about 100–200, typically about 150, gallons of water or a strong mineral acid solution such as hydrochloric acid, about 3000 gallons of a light hydrocarbon such as kerosene and about 2–4, typically about 3, gallons of the Tween 20 stabilizing agent has been found suitable for slurrying a high concentration of sand. In the above-described field test with about 25,000 gallons of fracturing fluid, about 2000–4000 gallons of this nonvolatile sand-carrying liquid is circulated through pump 21, bypass line 22 and valve 23, until its viscosity is in the range of about 10–50 poises or greater and then as this viscous liquid continues to circulate, the required amount of propping agent is added to the suction of the pump 21 either in tank 19 or in a special sand-blending apparatus placed somewhere in the circulating system. During this premixing of the formation props and viscous carrying agent, valves 24 and 25 are closed. In the test previously discussed, after the viscosity of this carrying agent was sufficiently high to prevent the propping agent from settling in tank 19, to about 30,000 pounds of a well rounded sand, Flint Shot Ottawa sand, having a particle size typically within the range 20–40 mesh U. S. sieve was added slowly, as above described.

In operation, according to the preferred process, after the gelling agent is prepared as described above and is ready in tank 10 for mixing with the volatile liquid from tanks 11 and after the propping agent is in suspension in the carrying agent in tank 19, the three components of the fracturing fluid are ready for mixing and injection into the well. In some cases an ungelled volatile liquid may be injected into the well ahead of the fracturing fluid. After this "load oil" is in the well, if used, valves 13, 23 and 25 are closed and valves 14, 15 and 24 are opened. Circulating pumps 12 and 21, emulsifier pump 17 and high pressure pumps 18 are started. Actually either valve 25 or 24, or both, may be opened so that the propping agent in tank 19 is blended with the primary emulsion discharged from the emulsifier pump 17 either in the suction and/or discharged from high pressure pumps 18. Preferably, as indicated, the valve 25 is closed and valve 24 is opened so that the sand-laden fluid in tank 19 is blended with the primary emulsion after the emulsion has passed through the high pressure pumps. Obviously, this provides increased capacity, protects the emulsifier pump from high pressure, and, additionally, protects the high pressure pumps 18 from erosion due to the granular material in the fluid pumped.

The fracturing fluid, comprising a mixture of, typically, about 10 parts by volume of the primary emulsion and about 1 part by volume of the sand-laden liquid, is injected into well 15 and displaced down the well to the gas-producing formation which is to be fractured. After this low penetrating fracturing fluid fills the well 15, a high pressure is built up by the pumps, and, when the formation breakdown pressure is reached or when it becomes sufficient to open existing fractures, the fracturing fluid enters the formation through a fracture or fractures carrying the propping agent there into, as is well known in the art. After all of the fracturing fluid has been injected into the well and displaced into the formation by use of a "follower" fluid such as gas or a volatile liquid of a volume sufficient at least to fill the well, all of the pumps, including the emulsifier pump 17, are stopped and the well 15 may be shut-in temporarily. The acid or other incorporated gel breaker in the emulsion tends to decompose the emulsion stabilizing agent or otherwise increase the filtrate rate of the fracturing fluid and decrease the viscosity until the fracturing fluid has a relatively low viscosity and high filtrate rate which will permit it readily to mix with, be displaced by, or dried up by the gas within the fractured formation. After a few hours, typically 10–24 hours, the well is placed back on production. Since the major component of the fracturing fluid is miscible with the gas or is otherwise dried up or vaporized by the gas in the formation, any of the fracturing fluid leaking off from a fracture into the interstices of the rock will eventually, if not immediately, by displaced or removed from the formation so that the permeability of the formation itself adjacent the fracture will not be damaged or decreased. The permeability of the fracture itself which contains the propping agent will, of course, be substantially higher than the permeability of the formation initially, and, therefore, the total productivity of the formation will be increased substantially by the operation described.

While reference has been made in the above-detailed description to a preferred composition and process, it will be apparent, as indicated in many instances, that other compositions and variations of the procedure can be employed without departing from the spirit of this invention. This invention should, therefore, be construed to be limited not by the above description but only by the scope of the appended claims.

We claim:

1. A method of gelling a volatile liquid comprising dissolving a gelling agent for said volatile liquid in a nonvolatile liquid under substantially atmospheric pressure while said volatile liquid is maintained under a superatmospheric pressure, flowing a major amount of said volatile liquid and a minor amount of said nonvolatile liquid together under a superatmospheric pressure greater than the vapor pressure of said volatile liquid, and shearing the mixture of said volatile liquid and said nonvolatile liquid under said superatmospheric pressure at high rate to produce a volatile liquid gel.

2. A method of gelling a liquefied petroleum gas comprising dissolving a liquefied petroleum gas-water emulsion stabilizing agent in an aqueous liquid under substantially atmospheric pressure while said liquefied petroleum gas is maintained under a superatmospheric pressure, flowing a minor amount of said aqueous liquid containing said agent and a major amount of said liquefied petroleum gas together under a superatmospheric pressure greater than the vapor pressure of said liquefied petroleum gas to produce a mixture, and shearing said mixture at high rate under a superatmospheric pressure greater than the vapor pressure of said mixture to produce a viscous gel.

3. A method according to claim 2 including the step of adding a small but significant amount of sand to said aqueous liquid and said agent.

4. A method according to claim 2 including the step of adding a small but significant amount of sand to said mixture.

5. A method according to claim 4 in which said sand is added after said mixture is gelled.

6. A method according to claim 2 including the step of adding a finely divided solid to said aqueous liquid before flowing said aqueous liquid and said liquid petroleum gas together, said finely divided solid being added in sufficient amount to reduce the filtrate rate of said mixture to less than about 100 cc. in 30 minutes.

7. A method of fracturing a gas-producing formation which is damaged by the presence of a nonvolatile liquid such as water and oil, comprising dissolving a liquefied petroleum gas-water emulsifier in an aqueous liquid, injecting a minor amount of said aqueous liquid containing said emulsifier into a major amount of a liquefied petroleum gas and a dormant demulsifier under a superatmospheric pressure greater than the vapor pressure of said liquefied petroleum gas, shearing the mixture of said aqueous liquid and said liquefied petroleum gas at high rate to produce an emulsion and adding to said emulsion a viscous slurry of sand to produce a fracturing fluid while maintaining said emulsion under a pressure greater than its vapor pressure, injecting said fracturing fluid into said formation under sufficient pressure to produce a fracture, and reducing the pressure on said formation to vaporize said volatile liquid.

8. A method of increasing the productivity of a gas-producing formation which is damaged by the injection of a nonvolatile liquid comprising premixing at about atmospheric pressure a minor quantity of a finely divided solid and between about 1 and about 3 parts by volume of polyoxyethylene sorbitan monolaurate emulsion stabilizer having a molecular weight of about 1200 with about 100 volumes of a 15 percent hydrochloric acid solution, injecting the premixture of acid solution and stabilizer into about 1000–3000 parts by volume of liquefied petroleum gas under a pressure as great as the vapor pressure of said liquefied petroleum gas, shearing said premixture and said liquefied petroleum gas at high rate under a pressure as great as the vapor pressure of said liquified petroleum gas to produce a primary emulsion, adding to said primary emulsion while maintaining it at superatmospheric pressure a slurry of sand in a secondary emulsion to produce a fracturing fluid, injecting said fracturing fluid into said formation under sufficient pressure to open a fracture, leaving said fracturing fluid in said fracture for sufficient time to permit said acid solution to destroy said stabilizer and break said emulsion, reducing the pressure on said formation sufficient to vaporize said liquified petroleum gas, and producing said well.

9. A method according to claim 8 wherein said secondary emulsion comprises between about 2 and about 4 parts by volume of said emulsion stabilizer, between about 100 and about 200 parts by volume of an aqueous liquid, and about 3000 parts by volume of a nonvolatile light hydrocarbon and wherein said primary emulsion contains about 5–15 parts by volume of said primary emulsion per 1 part by volume of said secondary emulsion.

10. A fracturing fluid comprising by volume about 2000 parts liquefied petroleum gas, about 50–200 parts of a 15 percent hydrochloric acid solution, about 1–4 parts of polyoxyethylene sorbitan monolaurate having a molecular weight of about 1200 as an emulsifier for said liquefied petroleum gas and said acid solution, and a small but significant amount of well-rounded sand suspended therein.

11. A fracturing fluid according to claim 10 including a finely divided solid in sufficient amount to reduce the filtrate rate of said fracturing fluid to less than about 100 cc. in 30 minutes.

12. A method according to claim 5 in which said sand is first suspended in a viscous liquid before it is added to said gelled mixture.

13. A method of fracturing a gas-producing formation with a volatile liquid which has a vapor pressure at atmospheric temperature greater than atmospheric pressure, comprising dissolving a gelling agent for said volatile liquid in a nonvolatile liquid which has a vapor pressure at atmospheric temperature lower than atmospheric pressure, said gelling agent being dissolved in said nonvolatile liquid at about atmospheric pressure while said volatile liquid is maintained at a superatmospheric pressure as great as its vapor pressure at atmospheric temperature, injecting a minor amount of said nonvolatile liquid into a major amount of said volatile liquid under a superatmospheric pressure greater than the vapor pressure of said volatile liquid at atmospheric temperature to decrease substantially the filtrate rate and increase the viscosity of said volatile liquid, adding to the mixture of said volatile liquid and said nonvolatile liquid a viscous slurry of a propping agent while maintaining said mixture under a superatmospheric pressure as great as the vapor pressure of said volatile liquid at atmospheric temperature, injecting said mixture and said slurry together into said formation under sufficient pressure to produce a fracture, and reducing the pressure on said formation to vaporize said volatile liquid.

14. A method of gelling a volatile liquid which has a vapor pressure at atmospheric temperature greater than atmospheric pressure, comprising dissolving a gelling agent for said volatile liquid in a non-volatile liquid which has a vapor pressure at atmospheric temperature lower than atmospheric pressure, said gelling agent being dissolved in said nonvolatile liquid at about atmospheric pressure while said volatile liquid is maintained at a superatmospheric pressure as great as its vapor pressure at atmospheric temperature, injecting a minor amount of said nonvolatile liquid containing said gelling agent into a major amount of said volatile liquid under a superatmospheric pressure as great as the vapor pressure of said volatile liquid at atmospheric temperature, and shearing the mixture of said gelling agent said volatile liquid and said nonvolatile liquid at a high rate and under a pressure as great as the vapor pressure of said volatile liquid at atmospheric temperature to produce an emulsion.

References Cited in the file of this patent
UNITED STATES PATENTS

| | | |
|---|---|---|
| 2,689,009 | Brainerd et al. | Sept. 14, 1954 |
| 2,742,426 | Brainerd | Apr. 17, 1956 |
| 2,751,360 | Van Strien | June 19, 1956 |